(12) United States Patent
Yan et al.

(10) Patent No.: US 11,228,965 B2
(45) Date of Patent: Jan. 18, 2022

(54) DETERMINING A TIME-FREQUENCY RESOURCE USING A SYSTEM PARAMETER

(71) Applicant: Motorola Mobility LLC, Chicago, IL (US)

(72) Inventors: Zhi Yan, Beijing (CN); Xiaodong Yu, Beijing (CN); Haipeng Lei, Beijing (CN); Lianhai Wu, Beijing (CN); Yingying Li, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 128 days.

(21) Appl. No.: 16/497,148

(22) PCT Filed: Mar. 24, 2017

(86) PCT No.: PCT/CN2017/078105
§ 371 (c)(1),
(2) Date: Sep. 24, 2019

(87) PCT Pub. No.: WO2018/170894
PCT Pub. Date: Sep. 27, 2018

(65) Prior Publication Data
US 2021/0127323 A1 Apr. 29, 2021

(51) Int. Cl.
*H04W 48/12* (2009.01)
*H04L 5/16* (2006.01)
*H04W 56/00* (2009.01)

(52) U.S. Cl.
CPC ............ *H04W 48/12* (2013.01); *H04L 5/16* (2013.01); *H04W 56/00* (2013.01)

(58) Field of Classification Search
CPC ........ H04W 48/12; H04W 56/00; H04L 5/16; H04L 5/14
See application file for complete search history.

(56) References Cited

U.S. PATENT DOCUMENTS

2009/0316603 A1* 12/2009 Amerga ............... H04W 48/08
370/254
2017/0290001 A1* 10/2017 Axmon ............ H04W 72/0413
2017/0317806 A1* 11/2017 Beale ............... H04W 72/0406
2018/0213468 A1*  7/2018 Chatterjee ........... H04W 48/10
(Continued)

FOREIGN PATENT DOCUMENTS

CN       102067676 A      5/2011
WO     2017019133 A1      2/2017
WO     2017039373 A1      3/2017

OTHER PUBLICATIONS

Nokia et al., "R1-161844 Remaining issues on NB-SIB1 transmission for NB-IoT", Mar. 2016, 3GPP TSG-RAN WG1 NB-IoT Ad-Hoc Meeting, Sophia Antipolis, France, Mar. 22-24, 2016, Total pp. 3 (Year: 2016).*

(Continued)

*Primary Examiner* — Shah M Rahman
(74) *Attorney, Agent, or Firm* — Kunzler Bean & Adamson (57) ABSTRACT

Apparatuses, methods, and systems are disclosed for determining a time-frequency resource for transmitting and/or receiving using a system parameter. One apparatus (200) includes a receiver (212) that receives (702) system information on a time-frequency resource. The time-frequency resource is determined by a system parameter, and the system parameter includes a system operation mode.

16 Claims, 7 Drawing Sheets

(56) References Cited

U.S. PATENT DOCUMENTS

| | | | | |
|---|---|---|---|---|
| 2018/0262975 | A1* | 9/2018 | Martinez Tarradell | ........................ H04W 74/008 |
| 2018/0316464 | A1* | 11/2018 | Stern-Berkowitz | ........................... H04L 1/1657 |
| 2019/0036756 | A1* | 1/2019 | Yi | ............................ H04L 67/12 |
| 2019/0045553 | A1* | 2/2019 | Zhang | .................... H04L 5/0048 |
| 2019/0053061 | A1* | 2/2019 | Sui | ......................... H04L 5/0091 |
| 2019/0239170 | A1* | 8/2019 | Thangarasa | .......... H04W 52/365 |
| 2019/0319764 | A1* | 10/2019 | Nader | .................... H04L 5/0053 |

OTHER PUBLICATIONS

PCT/CN2017/078105, Notification of Transmittal of the International Search Report and the Written Opinion of the International Searching Authority, or the Declaration, dated Dec. 1, 2017.

ZTE "NB-SIB1 design for NB-IoT" 3GPP TSG RAN WG1 Meeting #84 R1-160470, Feb. 19, 2016.

Huawei, HiSilicon, "On multi-PRB operation", 3GPP TSG RAN WG1 Meeting #84 R1-161039, Feb. 19, 2016.

3GPP, "3rd Generation Partnership Project; Technical Specification Group Radio Access Network; Evolved Universal Terrestrial Radio Access (E-UTRA); Multiplexing and channel coding (Release 15)", 3GPP TS 36.212 V15.2.1, Jul. 2018, pp. 1-245.

3GPP, "3rd Generation Partnership Project; Technical Specification Group Radio Access Network; Evolved Universal Terrestrial Radio Access (E-UTRA); Physical channels and modulation (Release 15)", 3GPP TS 36.211 V15.2.0, Jun. 2018, pp. 1-236.

\* cited by examiner

DETERMINING A TIME-FREQUENCY RESOURCE USING A SYSTEM PARAMETER

FIELD

The subject matter disclosed herein relates generally to wireless communications and more particularly relates to determining a time-frequency resource using a system parameter.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Primary Synchronization Signal ("PSS"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Secondary Synchronization Signal ("SSS"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a high carrier frequency (e.g., >6 GHz) may be used, such as millimeter wave. In some networks, a downlink frame structure for FDD may include: NB-PSS/SSS/PBCH/SIB1 transmitted in anchor PRB/carrier; NB-PSS transmitted in subframe 5 with a period of 10 ms; NB-SSS transmitted in subframe 9 with a period of 20 ms; NB-PBCH transmitted in subframe 0; NB-SIB1 transmitted in subframe 4 in every other 10 ms-frame; and the period of NB-SIB1 being 256 radios with repetition {4, 8, 16}.

In some configurations, a downlink frame structure for TDD may include: the PSS/SSS/PBCH/SIB1 may be designed to be transmitted in subframes 0, 1, 5, and 6; subframe 1 and subframe 6 are special subframes, if subframe 0 and 5 is used for PSS/SSS transmission; and PBCH may be transmitted in subframe 1 and subframe 6 only if long downlink pilot time slot ("DwPTS") is configured in a special subframe configuration, so there may be no sufficient physical resource for SI transmission. In the FDD and TDD downlink frame structures described, NB-PSS/SSS/PBSCH/SIB1 are limited thereby limiting their availability to UEs.

BRIEF SUMMARY

Apparatuses for determining a time-frequency resource using a system parameter are disclosed. Methods and systems also perform the functions of the apparatus. In one embodiment, the apparatus includes a receiver that receives system information on a time-frequency resource. In certain embodiments, the time-frequency resource is determined by a system parameter, and the system parameter includes a system operation mode.

In various embodiments, the system parameter includes a cell identification, a number of a system frame, a number of a system subframe, a system duplex mode, or some combination thereof. In one embodiment, the system operation mode is selected from a group including in-band, guard band, and standalone operation. In a further embodiment, the system operation mode is determined by a system broadcast channel message. In certain embodiments, the system subframe is a base time unit of system information and the number of the system subframe is a nonnegative number and is determined and/or derived by a system synchronization signal. In various embodiments, the system frame includes multiple system subframes and the number of the system frame is a nonnegative number and is determined and/or derived by a system broadcast channel signal. In some embodiments, the cell identification is determined by a system synchronization signal. In one embodiment, the system duplex mode is selected from a group including frequency division duplex, time division duplex, half-frequency division duplex mode.

A method for determining a time-frequency resource using a system parameter, in one embodiment, includes receiving system information on a time-frequency resource. In some embodiments, the time-frequency resource is determined by a system parameter, and the system parameter includes a system operation mode.

In one embodiment, an apparatus includes a transmitter that transmits system information on a time-frequency resource. In some embodiments, the time-frequency resource is determined by a system parameter, and the system parameter includes a system operation mode.

In various embodiments, the system parameter includes a cell identification, a number of a system frame, a number of a system subframe, a system duplex mode, or some combination thereof. In one embodiment, the system operation mode is selected from a group including in-band, guard band, and standalone operation. In a further embodiment, the system operation mode is determined by a system broadcast channel message. In certain embodiments, the system subframe is a base time unit of system information and the number of the system subframe is a nonnegative number and is determined and/or derived by a system synchronization signal. In various embodiments, the system frame includes multiple system subframes and the number of the system frame is a nonnegative number and is determined and/or derived by a system broadcast channel signal. In some embodiments, the cell identification is determined by a system synchronization signal. In one embodiment, the system duplex mode is selected from a group including frequency division duplex, time division duplex, half-frequency division duplex mode.

A method for determining a time-frequency resource using a system parameter, in one embodiment, includes transmitting system information on a time-frequency resource. In some embodiments, the time-frequency resource is determined by a system parameter, and the system parameter includes a system operation mode.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
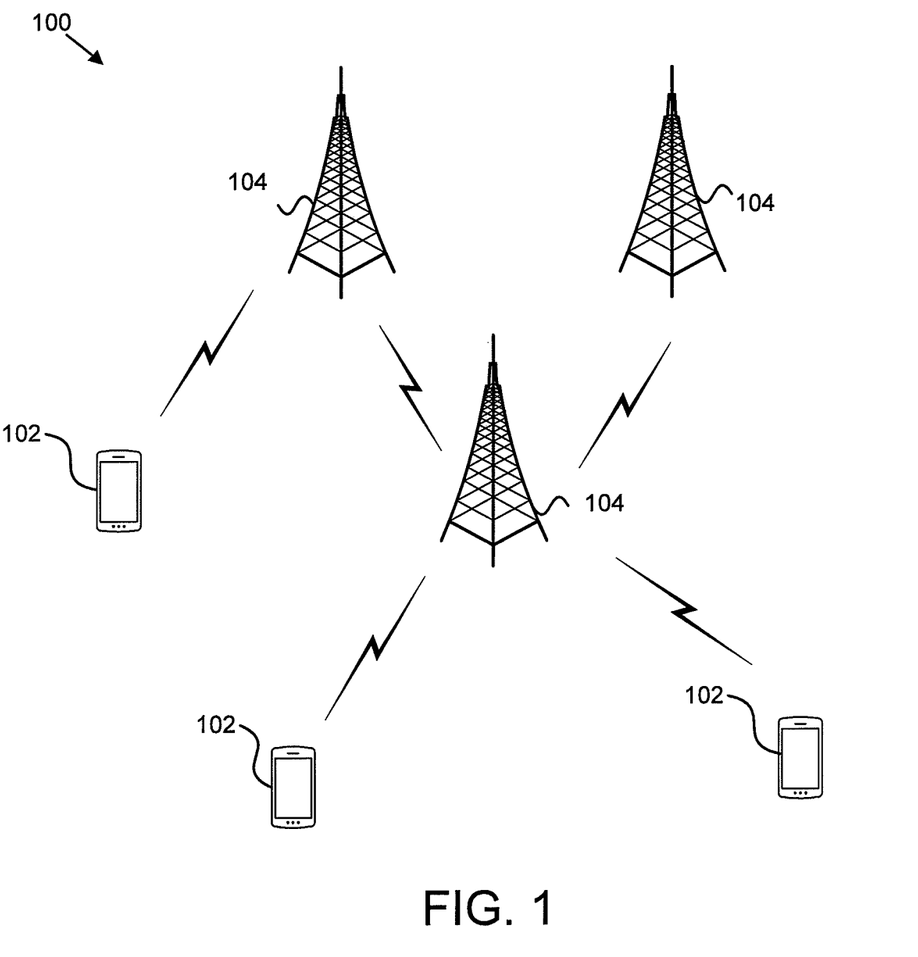
FIG. 1 is a schematic block diagram illustrating one embodiment of a wireless communication system for determining a time-frequency resource using a system parameter.

FIG. 1 depicts an embodiment of a wireless communication system 100 for determining a time-frequency resource using a system parameter. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3 GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In certain embodiments, a remote unit 102 may receive system information on a time-frequency resource. In some embodiments, the time-frequency resource is determined by a system parameter, and the system parameter includes a system operation mode. Accordingly, a remote unit 102 may be used for determining a time-frequency resource using a system parameter.

In various embodiments, a base unit 104 may transmit system information on a time-frequency resource. In some embodiments, the time-frequency resource is determined by a system parameter, and the system parameter includes a system operation mode. Accordingly, a base unit 104 may be used for determining a time-frequency resource using a system parameter.

Figure 2:
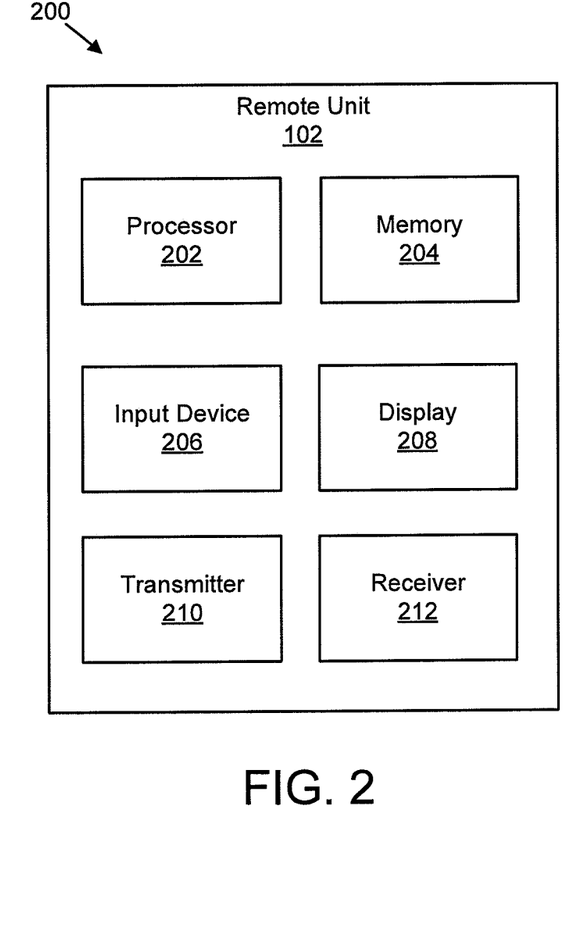
FIG. 2 is a schematic block diagram illustrating one embodiment of an apparatus that may be used for determining a time-frequency resource using a system parameter.

FIG. 2 depicts one embodiment of an apparatus 200 that may be used for determining a time-frequency resource using a system parameter. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive system information on a time-frequency resource. In some embodiments, the time-frequency resource is determined by a system parameter, and the system parameter includes a system operation mode. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
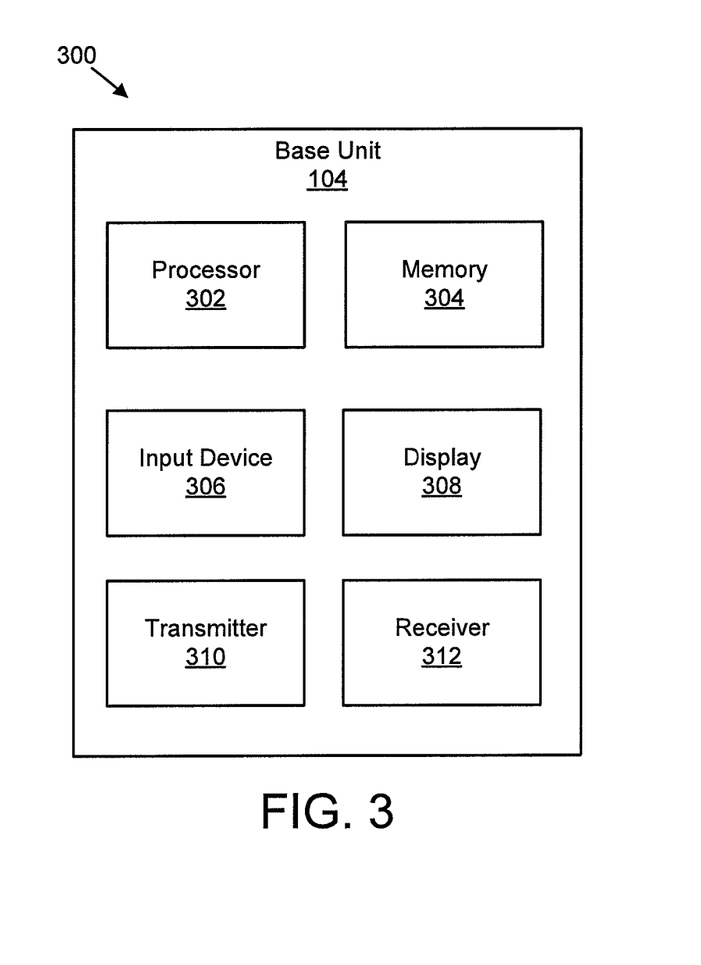
FIG. 3 is a schematic block diagram illustrating one embodiment of an apparatus that may be used for determining a time-frequency resource using a system parameter.

FIG. 3 depicts one embodiment of an apparatus 300 that may be used for determining a time-frequency resource using a system parameter. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit system information on a time-frequency resource. In some embodiments, the time-frequency resource is determined by a system parameter, and the system parameter includes a system operation mode. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
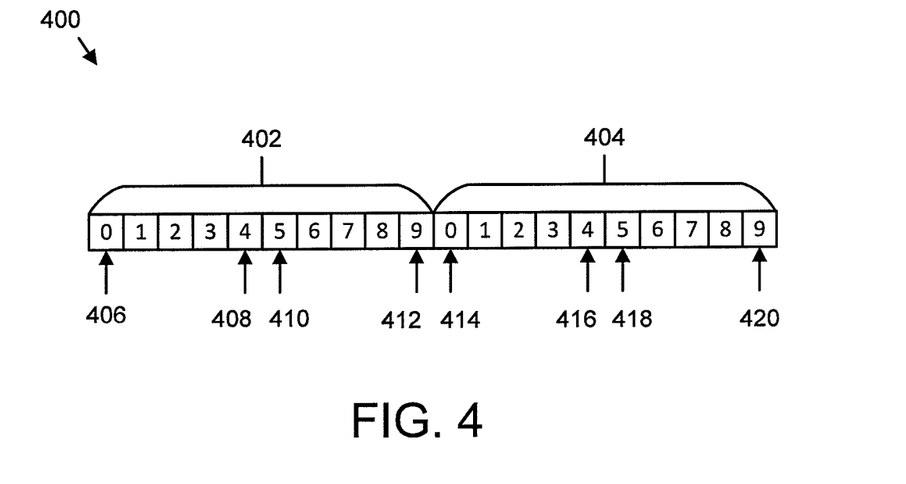
FIG. 4 is a schematic block diagram illustrating one embodiment of a frame structure.

FIG. 4 is a schematic block diagram illustrating one embodiment of a frame structure 400. The frame structure 400 includes a first frame 402 and a second frame 404. Each of the first and second frames 402 and 404 may be transmitted over a 10 ms period. Moreover, each of the first and second frames 402 and 404 includes 10 subframes labeled 0 through 9 and each being transmitted over a 1 ms period. In some embodiments, the frame structure 400 for FDD includes: NB-PBCH 406 in subframe 0 of the first frame 402, NB-SIB1 408 in subframe 4 of the first frame 402, NB-PSS 410 in subframe 5 of the first frame 402, NB-SSS 412 in subframe 9 of the first frame 402, NB-PBCH 414 in subframe 0 of the second frame 404, an additional NB-PBCH 416 in subframe 4 of the second frame 404, NB-PSS 418 in subframe 5 of the second frame 404, and an additional NB-SSS 420 in subframe 9 of the second frame 404. In certain embodiments, the additional NB-PBCH 416 and the additional NB-SSS 420 may be in every other 10 ms frame, as illustrated. Moreover, the additional NB-PBCH 416 and the additional NB-SSS 420 may, in certain embodiments, be additional elements to increase the availability of NB-PBCH and NB-SSS.

In some embodiments, NB-SIB1 may be transmitted in a non-anchor PRB or another potential subframe. In certain embodiments, if a system operation mode is in-band, an additional NB-SIB1 may be transmitted in a non-anchor PRB. In various embodiments, if a system operation mode is guard band or stand-alone, an additional NB-SIB1 may be transmitted in a potential subframe except subframes 0, 4, 5, and 9. In some embodiments, a non-anchor PRB and potential subframe may be determined based on a cell identification, a number of a system frame, a number of a system subframe, a system duplex mode, and/or a system operation mode. In certain embodiments, a system operation mode and/or a number of a system frame may be determined by NB-PBCH. In various embodiments, a cell identification and/or a number of a system subframe may be determined by NB-PSS and/or NB-SSS.

Figure 5:
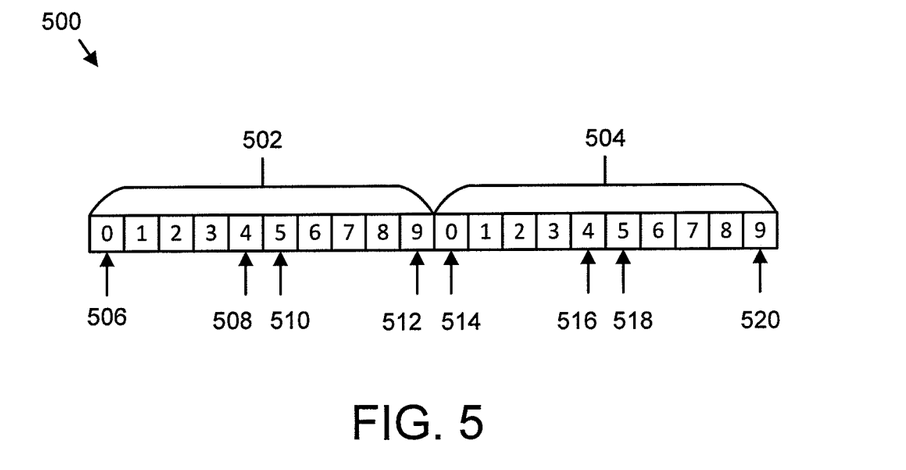
FIG. 5 is a schematic block diagram illustrating another embodiment of a frame structure.

FIG. 5 is a schematic block diagram illustrating another embodiment of a frame structure 500. The frame structure 500 includes a first frame 502 and a second frame 504. Each of the first and second frames 502 and 504 may be transmitted over a 10 ms period. Moreover, each of the first and second frames 502 and 504 includes 10 subframes labeled 0 through 9 and each being transmitted over a 1 ms period. In some embodiments, the frame structure 500 may be for an in-band operation mode and may include: NB-PBCH 506 in subframe 0 of the first frame 502, NB-SIB1 508 in subframe 4 of the first frame 502, NB-PSS 510 in subframe 5 of the first frame 502, NB-SSS 512 in subframe 9 of the first frame 502, NB-PBCH 514 in subframe 0 of the second frame 504, an additional NB-PBCH 516 in subframe 4 of the second frame 504, NB-PSS 518 in subframe 5 of the second frame 504, and an additional NB-SSS 520 in subframe 9 of the second frame 504. In certain embodiments, the additional NB-PBCH 516 and the additional NB-SSS 520 may be in every other 10 ms frame, as illustrated. Moreover, the additional NB-PBCH 516 and the additional NB-SSS 520 may, in certain embodiments, be additional elements to increase the availability of NB-PBCH and NB-SSS.

In some embodiments, NB-SIB1 may be transmitted in a non-anchor PRB. For example, in one embodiment, if a system operation mode is in-band and a cell identification is even, NB-SIB1 may be transmitted in an upper neighboring PRB of subframe 9 (e.g., subframe 9 of the second frame 504). In certain embodiments, if a system operation mode is in-band and a cell identification is odd, NB-SIB1 may be transmitted in a lower neighboring PRB of subframe 9 (e.g., subframe 9 of the first frame 502).

Figure 6:
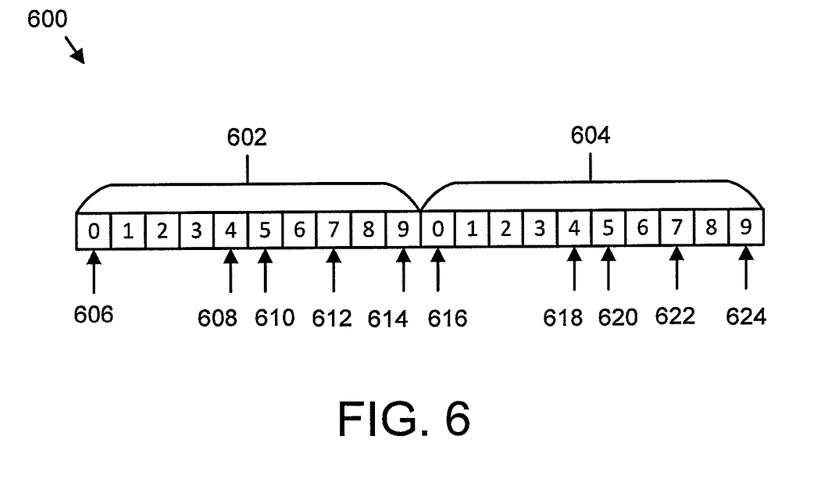
FIG. 6 is a schematic block diagram illustrating a further embodiment of a frame structure.

FIG. 6 is a schematic block diagram illustrating a further embodiment of a frame structure 600. The frame structure 600 includes a first frame 602 and a second frame 604. Each of the first and second frames 602 and 604 may be transmitted over a 10 ms period. Moreover, each of the first and second frames 602 and 604 includes 10 subframes labeled 0 through 9 and each being transmitted over a 1 ms period. In some embodiments, the frame structure 600 may be for a guardband, standalone, or in-band operation mode and may include: NB-PBCH 606 in subframe 0 of the first frame 602, NB-SIB1 608 in subframe 4 of the first frame 602, NB-PSS 610 in subframe 5 of the first frame 602, an additional NB-SIB1 612 in subframe 7 of the first frame 602, NB-SSS 614 in subframe 9 of the first frame 602, NB-PBCH 616 in subframe 0 of the second frame 604, an additional NB-PBCH 618 in subframe 4 of the second frame 604, NB-PSS 620 in subframe 5 of the second frame 604, an additional NB-SIB1 622 in subframe 7 of the second frame 604, and an additional NB-SSS 624 in subframe 9 of the second frame 604. In certain embodiments, the additional NB-PBCH 618 and the additional NB-SSS 624 may be in every other 10 ms frame, as illustrated. Moreover, the additional NB-PBCH 618 and the additional NB-SSS 624 may, in certain embodiments, be additional elements to increase the availability of NB-PBCH and NB-SSS. Further, while the additional NB-SIB1 612 and the additional NB-SIB 622 are illustrated as being in subframe 7, in some embodiments, the additional NB-SIB1 612 and the additional NB-SIB 622 may be in one of subframes 1, 2, 3, 6, 7, or 8

In some embodiments, NB-SIB1 may be transmitted in an anchor PRB. For example, in one embodiment, if a cell identification is even, a number of subframe is even, and a system operation mode is guardband and/or standalone, NB-SIB1 may be transmitted in an anchor PRB of subframe 6. In certain embodiments, if a cell identification is odd, a number of subframe is even, and a system operation mode is guardband and/or standalone, NB-SIB1 may be transmitted in an anchor PRB of subframe 7. In some embodiments, if a cell identification is even, a number of subframe is odd, and a system operation mode is guardband and/or standalone, NB-SIB1 may be transmitted in an anchor PRB of subframe 1. In certain embodiments, if a cell identification is odd, a number of subframe is odd, and a system operation mode is guardband and/or standalone, NB-SIB1 may be transmitted in an anchor PRB of subframe 2. As may be appreciated, the embodiments described herein are merely examples of possibilities and other combinations of system parameters may be used to determine subframes for various system information.

Figure 7:
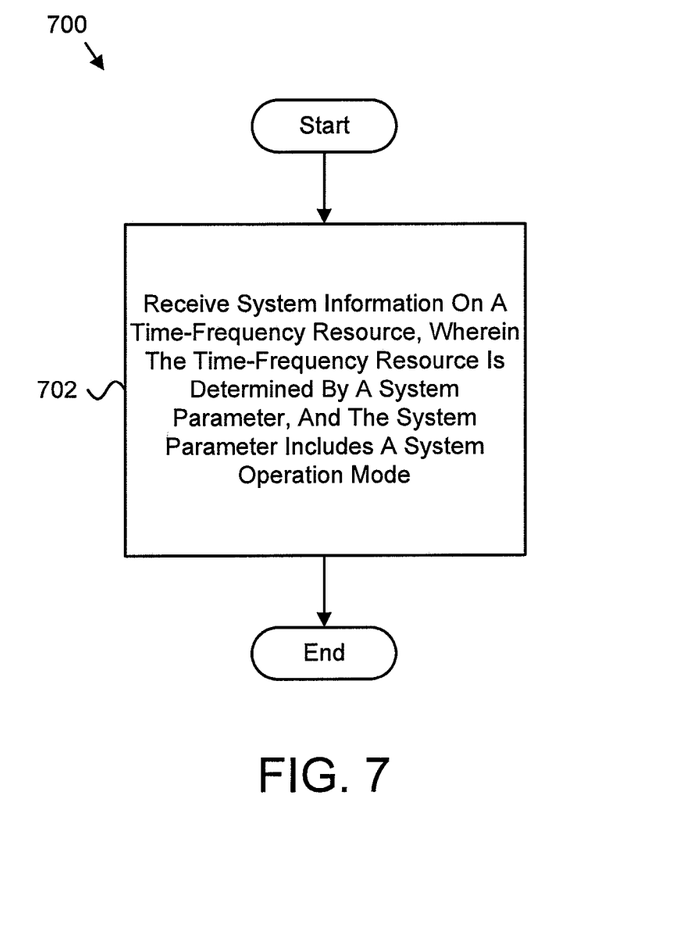
FIG. 7 is a schematic flow chart diagram illustrating one embodiment of a method for determining a time-frequency resource using a system parameter.

FIG. 7 is a schematic flow chart diagram illustrating another embodiment of a method 700 for determining a time-frequency resource using a system parameter. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 system information on a time-frequency resource. In some embodiments, the time-frequency resource is determined by a system parameter, and the system parameter includes a system operation mode.

In various embodiments, the system parameter includes a cell identification, a number of a system frame, a number of a system subframe, a system duplex mode, or some combination thereof. In one embodiment, the system operation mode is selected from a group including in-band, guard band, and standalone operation. In a further embodiment, the system operation mode is determined by a system broadcast channel message. In certain embodiments, the system subframe is a base time unit of system information and the number of the system subframe is a nonnegative number and is determined and/or derived by a system synchronization signal. In various embodiments, the system frame includes multiple system subframes and the number of the system frame is a nonnegative number and is determined and/or derived by a system broadcast channel signal. In some embodiments, the cell identification is determined by a system synchronization signal. In one embodiment, the system duplex mode is selected from a group including frequency division duplex, time division duplex, half-frequency division duplex mode.

Figure 8:
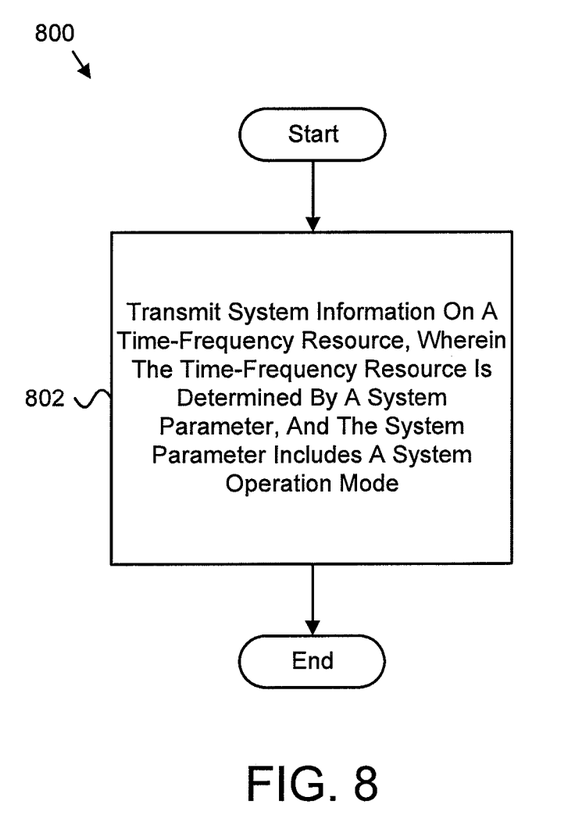
FIG. 8 is a schematic flow chart diagram illustrating another embodiment of a method for determining a time-frequency resource using a system parameter.

FIG. 8 is a schematic flow chart diagram illustrating a further embodiment of a method 800 for determining a time-frequency resource using a system parameter. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include transmitting 802 system information on a time-frequency resource. In some embodiments, the time-frequency resource is determined by a system parameter, and the system parameter includes a system operation mode.

In various embodiments, the system parameter includes a cell identification, a number of a system frame, a number of a system subframe, a system duplex mode, or some combination thereof. In one embodiment, the system operation mode is selected from a group including in-band, guard band, and standalone operation. In a further embodiment, the system operation mode is determined by a system broadcast channel message. In certain embodiments, the system subframe is a base time unit of system information and the number of the system subframe is a nonnegative number and is determined and/or derived by a system synchronization signal. In various embodiments, the system frame includes multiple system subframes and the number of the system frame is a nonnegative number and is determined and/or derived by a system broadcast channel signal. In some embodiments, the cell identification is determined by a system synchronization signal. In one embodiment, the system duplex mode is selected from a group including frequency division duplex, time division duplex, half-frequency division duplex mode.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a receiver that receives system information on subframes and a frequency carrier, wherein the subframes and the frequency carrier are determined by a system parameter, and the system parameter comprises a system operation mode, a cell identification, and a system duplex mode,
wherein the system duplex mode is selected from a group comprising frequency division duplex, time division duplex, half-frequency division duplex mode.

2. The apparatus of claim 1, wherein the system operation mode is selected from a group comprising in-band, guard band, and standalone operation.

3. The apparatus of claim 1, wherein the system operation mode is determined by a system broadcast channel message.

4. The apparatus of claim 1, wherein the cell identification is determined by a system synchronization signal.

5. A method comprising:
receiving system information on subframes and a frequency carrier, wherein the subframes and the frequency carrier are determined by a system parameter, and the system parameter comprises a system operation mode, a cell identification, and a system duplex mode,
wherein the system duplex mode is selected from a group comprising frequency division duplex, time division duplex, half-frequency division duplex mode.

6. The method of claim 5, wherein the system operation mode is selected from a group comprising in-band, guard band, and standalone operation.

7. The method of claim 5, wherein the system operation mode is determined by a system broadcast channel message.

8. The method of claim 5, wherein the system parameter comprises a system subframe, and the system subframe is a base time unit of system information and a number of the system subframe is a nonnegative number and is determined and/or derived by a system synchronization signal.

9. The method of claim 5, wherein the system parameter comprises a system frame, and the system frame comprises multiple system subframes and a number of the system frame is a nonnegative number and is determined and/or derived by a system broadcast channel signal.

10. The method of claim 5, wherein the cell identification is determined by a system synchronization signal.

11. An apparatus comprising:
a transmitter that transmits system information on subframes and a frequency carrier, wherein the subframes and the frequency carrier are determined by a system parameter, and the system parameter comprises a system operation mode, a cell identification, and a system duplex mode,
wherein the system duplex mode is selected from a group comprising frequency division duplex, time division duplex, half-frequency division duplex mode.

12. The apparatus of claim 11, wherein the system operation mode is selected from a group comprising in-band, guard band, and standalone operation.

13. A method comprising:
transmitting system information on subframes and a frequency carrier, wherein the subframes and the frequency carrier are determined by a system parameter, and the system parameter comprises a system operation mode, a cell identification, and a system duplex mode,
wherein the system duplex mode is selected from a group comprising frequency division duplex, time division duplex, half-frequency division duplex mode.

14. The method of claim 13, wherein the system operation mode is selected from a group comprising in-band, guard band, and standalone operation.

15. The method of claim 13, wherein the system parameter comprises a system frame, and the system frame comprises multiple system subframes and a number of the system frame is a nonnegative number and is determined and/or derived by a system broadcast channel signal.

16. The method of claim 13, wherein the cell identification is determined by a system synchronization signal.

* * * * *

UNITED STATES PATENT AND TRADEMARK OFFICE
CERTIFICATE OF CORRECTION

Page 1 of 2

PATENT NO. : 11,228,965 B2
APPLICATION NO. : 16/497148
DATED : January 18, 2022
INVENTOR(S) : Yan et al.

It is certified that error appears in the above-identified patent and that said Letters Patent is hereby corrected as shown below:

In the Claims

In Column 12, Line 34:
"and a frequency carrier," should read "and a carrier frequency,"

In Column 12, Lines 35:
"frequency carrier are determined" should read "carrier frequency are determined"

In Column 12, Line 41:
"division duplex, half-frequency division duplex" should read "division duplex, and half-frequency division duplex"

In Column 12, Lines 51-52:
"and a frequency carrier," should read "and a carrier frequency,"

In Column 12, Line 52-53:
"frequency carrier are determined" should read "carrier frequency are determined"

In Column 12, Lines 58:
"division duplex, half-frequency division duplex" should read "division duplex, and half-frequency division duplex"

In Column 13, Line 11:
"and a frequency carrier," should read "and a carrier frequency,"

In Column 13, Lines 35:
"and the frequency carrier are determined" should read "and the carrier frequency are determined"

In Column 13, Line 18:
"division duplex, half-frequency division duplex" should read "division duplex, and half-frequency Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office* division duplex"

In Column 14, Line 2-3:
"and a frequency carrier," should read "and a carrier frequency,"

In Column 14, Lines 3-4:
"and the frequency carrier are determined" should read "and the carrier frequency are determined"

In Column 14, Line 9:
"division duplex, half-frequency division duplex" should read "division duplex, and half-frequency division duplex"